Nov. 28, 1967   B. H. KRYZER ET AL   3,354,907
WATER CONDITIONING SYSTEM
Filed June 3, 1963   4 Sheets-Sheet 1
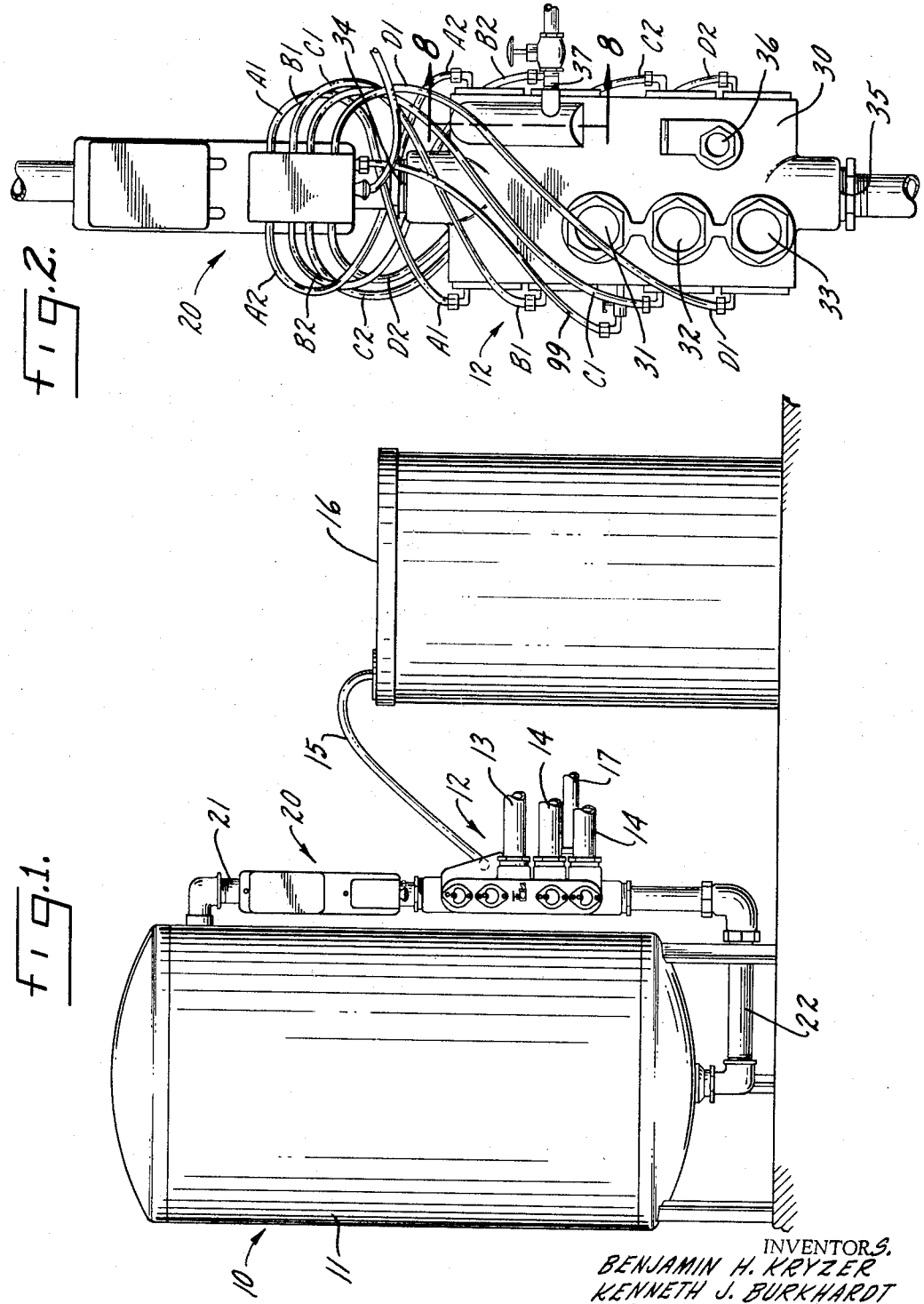
INVENTORS.
BENJAMIN H. KRYZER
KENNETH J. BURKHARDT
THOMAS J. SCHOENECKER
BY Byron, Hume, Groen & Clement
ATTORNEYS.

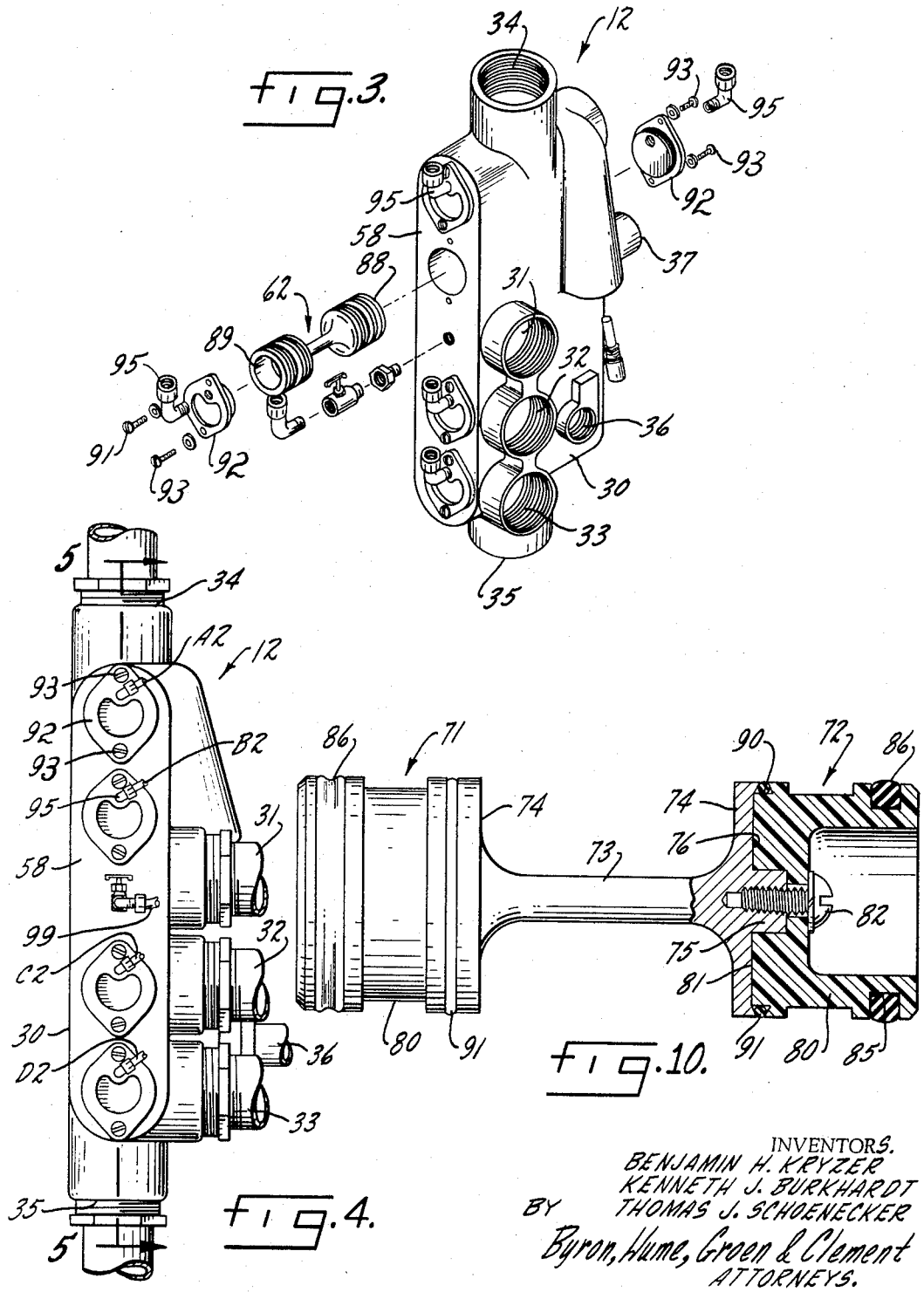

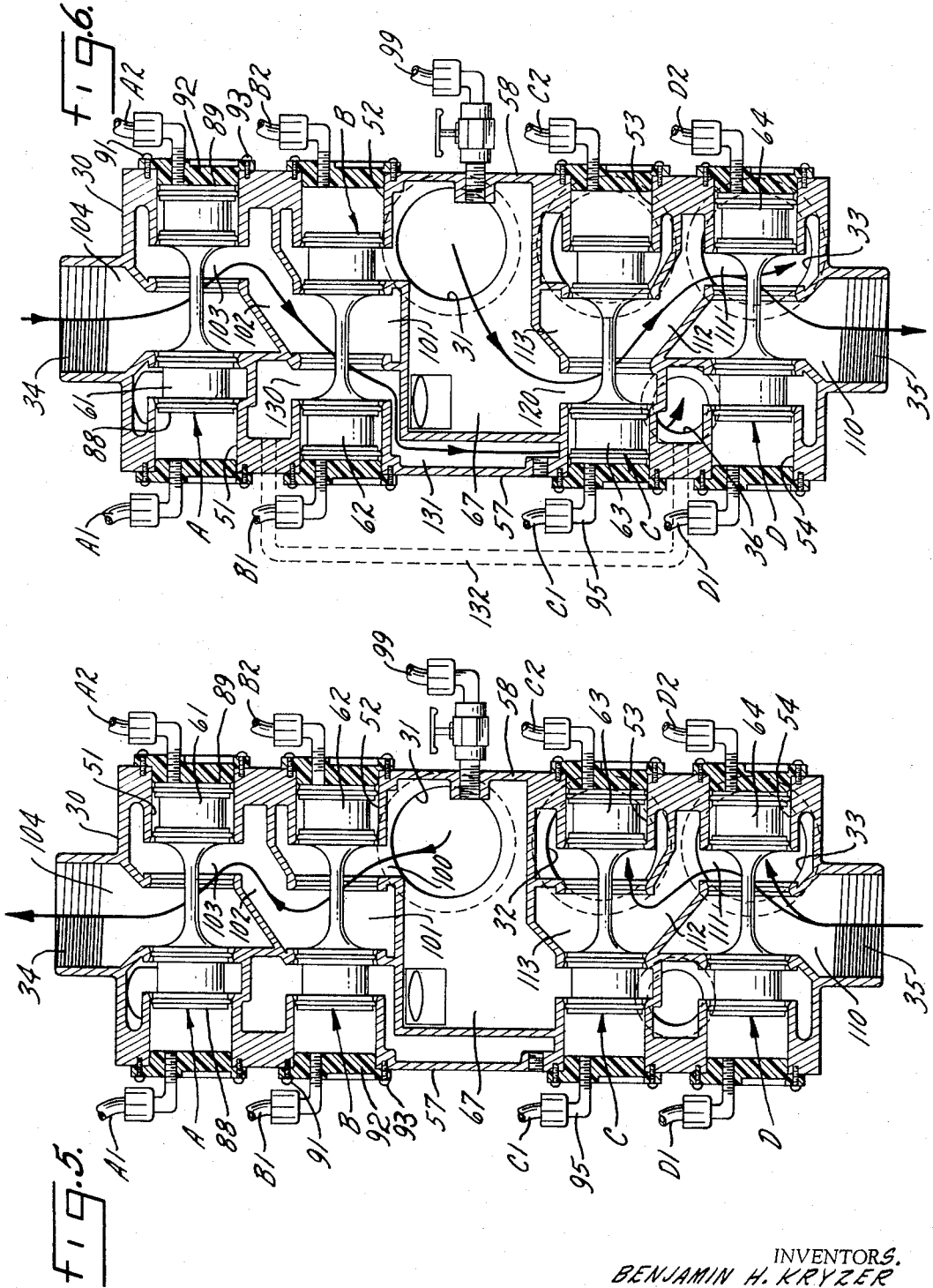

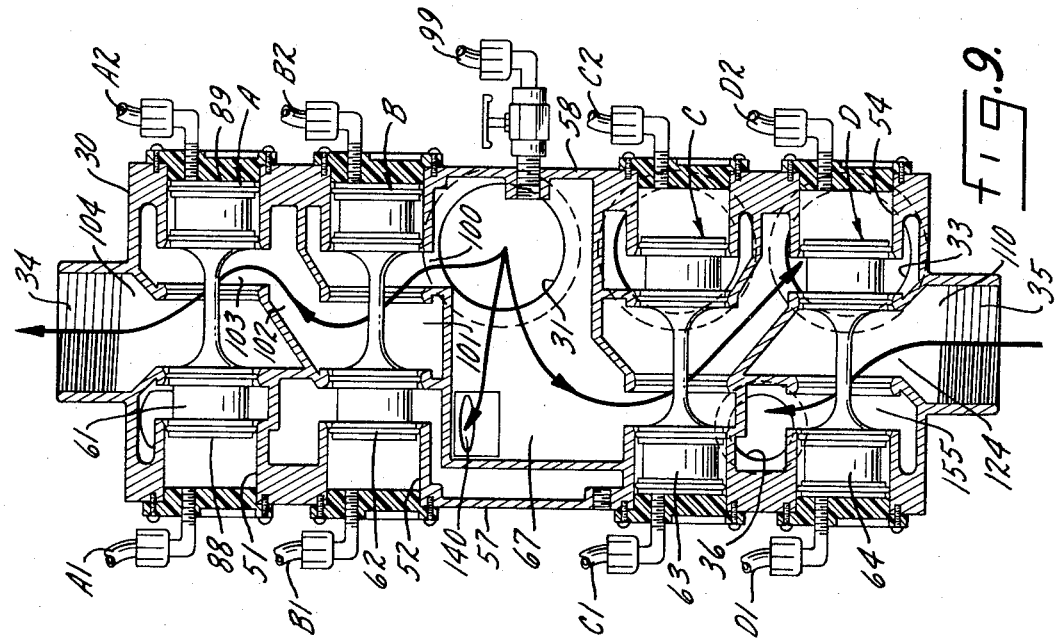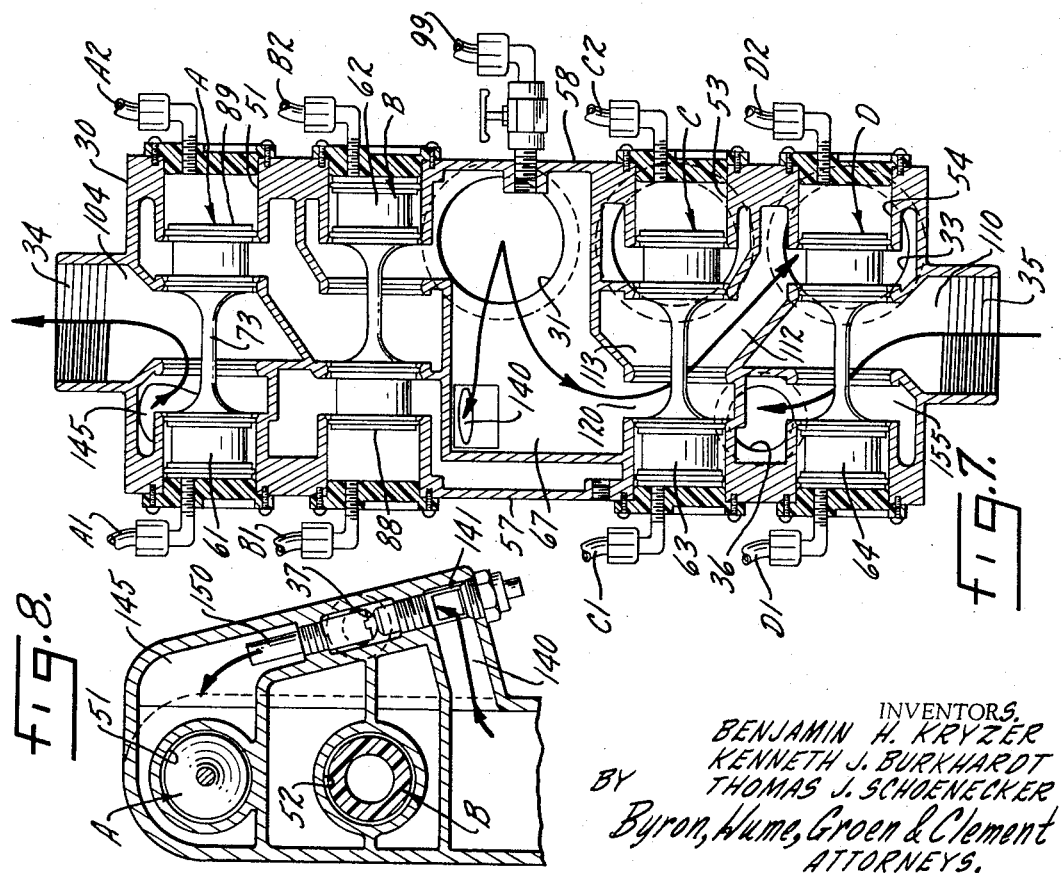

United States Patent Office 3,354,907
Patented Nov. 28, 1967

3,354,907
WATER CONDITIONING SYSTEM
Benjamin H. Kryzer, St. Paul, and Thomas J. Schoenecker, North St. Paul, Minn., and Kenneth J. Burkhardt, Oceanside, N.Y., assignors to Union Tank Car Company, Chicago, Ill., a corporation of New Jersey
Filed June 3, 1963, Ser. No. 284,936
6 Claims. (Cl. 137—599.1)

This invention relates in general to a water conditioning system. It deals more particularly with a valve arrangement for a water softener.

It is an object of the present invention to provide an improved valve arrangement for a water softener.

It is another object to provide a valve arrangement especially adapted for relatively high volume, commercial water softeners.

It is still another object to provide a valve arrangement for controlling the flow of service water, backwash water, recharging fluid, and rinse water, through a water softener.

It is yet another object to provide a valve arrangement which is simpler and more easily maintained than its presently known counterparts.

It is a further object to provide a valve arrangement unitarily incorporating an aspirator arranged to assure continuous effective brine delivery during the recharge stage of regeneration.

It is still a further object to provide a valve arrangement which is adaptable to bypass raw water to service during regeneration, or function without bypass of raw water to service during regeneration.

It is yet a further object to provide a valve arrangement which facilitates ready adaptation to simple, axially aligned branch pipes from the top and bottom of the softener tank.

It is another object to provide a valve arrangement which presents a slim, tank "hugging" configuration enhancing the looks and reducing the space requirements of the softener unit.

It is still another object to provide a valve arrangement which induces a relatively low pressure drop from inlet to outlet.

It is still another object to provide a piston-type valve arrangement including a valve piston construction which assures relatively more effective, trouble-free operation of the valve arrangement.

The foregoing and other objects are realized in accordance with the present invention by providing an improved arrangement for controlling the service water flow and regeneration cycles of a water softener. The valve arrangement, although especially adapted for use in high volume commercial water conditioning systems, is eminently suitable for other application including ion exchange systems in general. It is simple in construction and has a slim, inline construction which assures minimum space utilization and simplicity of incorporation in a water pipe complex. The valve arrangement affords raw water bypass to service, if desired, during regeneration. In addition to the foregoing, the construction and arrangement of both valve pistons and a valve aspirator are such that technical difficulties normally contemplated are obviated.

The invention, both as to its organization and the method of operation, taken with further objects and advantages thereof, will best be understood by reference to the following description taken in connection with the accompanying drawings, in which:

FIGURE 1 is a front elevational view of a water conditioning system incorporating a valve arrangement embodying features of the present invention, with parts removed;

FIGURE 2 is an enlarged front elevational view of the valve arrangement and its associated controller arrangement, with the controller arrangement rotated 90° for purposes of illustration;

FIGURE 3 is a partially exploded view, in perspective, of the arrangement;

FIGURE 4 is a side elevational view of the valve arrangement;

FIGURE 5 is a somewhat diagrammatic sectional view taken along line 5—5 of FIGURE 4, with the valve arrangement in its service position;

FIGURE 6 is a somewhat diagrammatic sectional view taken along line 6—6 of FIGURE 4 with the valve arrangement in its backwash position;

FIGURE 7 is a somewhat diagrammatic sectional view taken along line 7—7 of FIGURE 4 with the valve arrangement in its recharge position;

FIGURE 8 is a sectional view taken along line 8—8 of FIGURE 2;

FIGURE 9 is a somewhat diagrammatic sectional view taken along line 9—9 of FIGURE 4, with the valve arrangement in its fast rinse position; and FIGURE 10 is an enlarged elevational view, partially in section, of a piston assembly according to the present invention.

Referring now to the drawings, and particularly to FIGURE 1, a commercial water conditioning system is illustrated generally at 10. The water conditioning system 10 includes a large capacity water softener tank 11 and a valve arrangement 12, embodying features of the present invention, which controls the flow of raw water to the tank 11 from an inlet pipe 13 and returns softened water to one or both of two outlet pipes, according to the present invention. The valve arrangement 12 also directs recharging brine through a brine pipe 15 from a brine tank 16 to, and through, the tank 11 and back to a drain pipe 17.

The water conditioning system 10 furthers includes a controller arrangement 20 embodying features of another invention disclosed in the co-pending application of Thomas J. Schoenecker et al, entitled Water Conditioning System, Serial No. 284,935, filed June 3, 1963, now abandoned, and assigned to the same assignee as the present invention. The controller arrangement 20 is effective to mainpulate the valve arrangement 12 according to a predetermined schedule, discussed in detail in the aforementioned co-pending application, to cause the valve arrangement 12 to appropriately control water and brine flow in the foregoing manner.

In normal service operation of the commercial water softening system 10, raw water flows from the inlet pipe 13 through the valve arrangement 12 to a branch pipe assembly 21. The branch pipe assembly 21 carries the raw water to the top of the water softener tank 11 whereupon it descends through a conventional ion exchange resin bed (not shown) within the tank 11 and leaves the softener through a branch pipe assembly 22. The branch pipe assembly 22 carries softened water back to the valve arrangement 12 where it is discharged to one or both of the outlet pipes 14, one of which provides for raw water bypass to service during regeneration, while the other does not, according to a feature of the present invention hereinafter discussed in detail.

The softening process of the raw water continues in a generally conventional manner for a predetermined length of time, after which regeneration of the ion exchange resin bed is initiated. The valve arrangement 12 embodying features of the present invention, under the direction of the controller arrangement 20, cycles a complete regeneration of the resin bed according to the present invention.

The use of ion exchange resins to remove hardness ions in the form of calcium and magnesium and the like from raw water is well known, of course, as is regeneration of the resins with a brine solution. Accordingly, a detailed description of these concepts is not considered necessary to the understanding of the present invention. Suffice it to say that raw water passing through an ion exchange resin bed (not shown) is relieved of the majority of its hardness-inducing ions and emerges as softened water. When the ion exchange resin bed has become substantially saturated with hardness-inducing ions, it must be regenerated to remove these ions and revitalize its softening characteristics. This regeneration is accomplished, in a broadly well-known manner, by directing brine through the resin bed. This portion of the regeneration process is called the recharging stage. In addition to the recharging stage, regeneration in a commercial softening system 10 preferably includes a backwash stage in which raw water is passed in reverse flow through the ion exchange resin bed prior to recharging to stir and loosen up the bed, and a rinse stage in which raw water is passed through the resin bed after recharging to flush out residual brine and other foreign matter.

The valve arrangement 12, as seen in FIGURES 2 and 3, includes a valve body 30 having a raw water inlet orifice 31, a soft water outlet orifice 32, a soft water outlet orifice 33 having raw water bypass capabilities, a top inlet-outlet orifice 34, a bottom inlet-outlet orifice 35, a drain orifice 36, and a brine inlet orifice 37 having raw water outlet capabilities. The valve body 30 is preferably a one-piece metal casting of a copper alloy or the like and presents a slim, tank 11 hugging profile (see FIGURE 1). The inlet-outlet orifices 34 and 35 are axially aligned, as will be noted, and accordingly facilitate easy incorporation of the valve arrangement 12 in the normally aligned pipe assemblies 21 and 22, for example, of a water conditioning system.

In normal service softening raw water enters the valve body 30 through inlet orifice 31 and is directed out of the top inlet-outlet orifice 34 to the softener tank 11 where it passes through an ion exchange resin bed (not shown) and is softened. The water returns as relatively soft water to the valve body 30 through the bottom inlet-outlet orifice 35, and is discharged to service through either or both of the outlet orifices 32 and 33, according to the present invention. In the latter regard, if it is considered desirable to have service water available even if it is raw water, during the regeneration cycle, the outlet orifice 33 is connected in communication with its service pipe 14. On the other hand, if it is desirable to assure that raw water is not delivered to service at any time, the soft water outlet orifice 33 having raw water outlet capabilities is plugged off in any suitable manner. The ramifications of raw water bypass will be more clearly understood, of course, following a detailed description of the valve arrangement 12 and its operation.

Referring now to FIGURES 4-9 it will be seen that the valve body 30 contains a series of four valve bores 51-54 extending transversely through the body 30, between the edge faces 57 and 58 thereof, and having substantially co-planar and parallel axes. Four substantially identical valve cores 61-64 are mounted for two position sliding movement in the bores 51-54, respectively. The bores 51-54 and the cores 61-64 define four valves A, B, C, and D, the valves A and B being separated within the valve body 30 from the valves C and D by a raw water inlet chamber 67 which is in communication with the inlet orifice 31.

Each of the cores 61-64 is identical in construction and, accordingly, only one is described herein in detail, although corresponding reference numerals are applied to each. As seen in FIGURE 10, each core 61-64 includes a pair of piston heads 71 and 72 interconnected by a relatively small diameter rod 73. Each of the piston heads 71 and 72 is, in turn, identical in construction and corresponding reference numerals are applied to the corresponding parts of each head.

Each of the piston heads 71 and 72 includes an annular disc 74 formed unitarily on a corresponding end of the rod 73. The rod 73 and its annular discs 74 preferably comprise a metal casting of brass or the like for strength. An internally threaded projection 75 extends outwardly from the outer face 76 on each disc and provides a mounting pedestal for the annular body 80 of each piston head 71 and 72, the inner faces 81 of which seat tightly against the outer faces 76 of the plates 74.

The body 80 of each piston head 71 and 72 is preferably formed of plastic and is generally cup-like in shape, being secured to the connecting rod 73 by conventional machine screws 82. An annular, parallel wall groove 85 extends around the periphery of each body 80 adjacent its outermost extremity and seats a conventional annular "O" ring type seal 86.

According to the present invention, a dove-tailed groove 90 is formed around each of the piston heads 71 and 72 adjacent the juncture between a corresponding piston body 80 and a cooperating plate 74. Each dove-tailed groove 90 seats a conventional "O" ring 91 when the piston heads 71 and 72 are assembled. As will hereinafter be discussed in context, the dove-tailed seat of each "O" ring 91 prevents the ring from becoming unseated as a core responding valve core 61-64 slides appropriately back and forth from a first position to a second position in an appropriately ported bore 51-54.

Each of the valve bores 51-54 extends entirely through the valve body 30 between the opposite edge faces 57 and 58 of the body. One end 88 of each bore 51-54 opens onto the edge face 57 while the other edge 89 opens onto the opposite edge face 58. These opposite ends 88 and 89 of each valve bore 51-54 are tightly sealed by identical transparent plastic plates 92 secured to corresponding edge faces 57 and 58 of the body 30 by pairs of conventional machine bolts 93. Any suitable sealing material might be used between the plates 92 and corresponding edge faces 57 and 58 to provide a fluid-tight seal therebetween.

The plastic plates 92 are transparent to facilitate determining the position of the various valve cores 61-64 in their respective bores 51-54 and examining the condition of the bores and cores. The plates 92 are readily removable and, accordingly, it will be seen that improperly operating cores 61-64 can easily be removed after on-the-job inspection. As will be noted, the plates 92 extend a slight distance into corresponding bores 51-54 and provide position stops for the cores 61-64 at the opposite ends of the bores.

Each of the plastic plates 92 has a fluid inlet fitting 95 threaded therethrough into communication with corresponding ends 88 and 89 of the bores 51-54. The fitting 95 associated with the one end 88 of valve A is connected by pressure line A1 to the controller arrangement 20. Similarly, the fitting 95 associated with the other end 89 of valve A is connected by pressure line A2 to the controller arrangement 20. Correspondingly, the fittings 95 associated with the valves B, C, and D, are appropriately connected to the controller arrangement 20 by pressure lines B1 and B2, C1 and C2, and D1 and D2.

The controller arrangement 20 receives fluid under pressure from the valve body through a pressure line 99 (see FIGURE 2), as discussed in detail in the aforementioned copending application, and directs pressure to one end 88 of each valve A-D while venting the other end 89 of the valve to drain pressure, and vice versa. In this manner, and according to a predetermined schedule, each valve A-D may be held in a first position exemplified by the position of the valve core 61 in FIGURE 6, for example, moved to a second position exemplified by the position of the valve core 62 in FIGURE 6, and returned to the aforementioned first position. It is, of course, the positioning each valve core 61-64 in a corresponding valve bore 51–54 which determines the service and regeneration cycles of operation of the water conditioning system 10.

As seen in FIGURE 5, all of the valves A–D are held in their scond position by the controller arrangement 20 during normal service operation of the water conditioning system 10. Accordingly, raw water which enters the inlet chamber 67 from the inlet orifice 31 is directed into the valve bore 52 of the valve B through its second end port 100. The water passes out an intermediate port 101 in the bore 52 to a transfer passage 102. From the passage 102, raw water enters the bore 51 of the valve A through a second end port 103 thereof, and departs the bore 51 through its intermediate port 104 to the top inlet-outlet orifice 34.

As hereinbefore pointed out, the raw water passes from the top inlet-outlet orifice 34 through the water softener tank 11 and back to the bottom inlet-outlet orifice 35 of the valve arrangement 12 as softened water. The soft water enters the intermediate port 110 in the valve bore 54 of the valve D and is normally directed through a second end port 111 into a transfer passage 112. The softened water continues from the passage 112 through an intermediate port 113 in the valve bore of the valve C and is directed to service through the soft water outlet orifice 32. In such case the outlet orifice 33 is preferably plugged (not shown). According to the present invention, however, if raw water bypass during regeneration is desired, the outlet orifice 32 is plugged and the orifice 33 left open to a service pipe 14, as will hereinafter be explained in detail. The outlet orifices 32 and 33 feed into the service pipes 14, as has been pointed out, directing water treated by the water conditioning system 10 to an industrial operation or the like.

When the controller arrangement 20 calls for initiation of the regeneration cycle in the manner described in the aforementioned co-pending application, it is effective to direct fluid pressure to the ends 89 of the valves B and C while venting the opposite ends 88 thereof to drain pressure, through appropriate lines B1, C1, and B2, C2, of course. Accordingly, the valve cores 62 and 63 are moved into their first positions, as illustrated in FIGURE 6, changing the flow pattern of fluid through the valve body 30 to one where raw water is directed in reverse flow through the water softener tank 11 to stir or "backwash" the ion exchange resin bed therein (not shown) and prepare it for recharging.

In the backwash stage of regeneration, raw water enters the inlet chamber 67 from the inlet orifice 31 and is directed into the valve bore 53 of the valve C through its first end port 120, and out its intermediate port 113. From the port 113 the raw water proceeds through the transfer passage 112 to the second end port 111 in the valve bore 54 of the valve C. At this point, if the soft water orifice 33 having raw water bypass capabilities is not capped, raw water is sent out through a pipe 14 to service. As will hereinafter be pointed out, the valve arrangement 12 embodying features of the present invention provides raw water bypass, if desired, during the entire regeneration cycle. The advantages and ramifications of such an arrangement will be discussed in detail subsequent to a discussion of each stage of regeneration. Regardless of whether raw water is delivered to service through the soft water outlet orifice 33, however, raw water also passes through the bore 54 in the valve D and out its intermediate port 110 to the bottom inlet-outlet orifice 35.

The raw water passes from the bottom inlet-outlet orifice 35 through the ion exchange resin bed (not shown) in the water softener tank 11 in reverse flow, and out of the tank 11 back to the upper inlet-outlet orifice 34 in the valve body 30. Still referring to FIGURE 6, the raw water now loaded with whatever loose impurities it has removed from the ion exchange resin bed, enters the immediate port 104 in the valve bore 51 of the valve A and passes through the bore 51 to the second end port 103 therein. This raw water continues through the transfer passage 102 into the bore 52 of the valve B through its intermediate port 101. From the bore 52, the water passes out of the first end port 130 thereof, through a transfer passage 131 along the side 57 of the valve body 30, and out of the drain orifice 36 to the drain pipe 17.

As seen in dotted lines in FIGURE 6, as an alternative to the disposal of impurity-laden raw water in the foregoing manner, an external pipe 132 might be provided in lieu of the internal transfer passage 131. In such case, the impurity laden raw water would flow externally of the valve body 12 from the first end port 130 of the valve B to the drain orifice 36. Such an arrangement makes the casting of the valve body 30 somewhat simpler, of course, by eliminating the necessity of providing a transfer passage 131.

Returning now to the operation of the valve arrangement 12, after the backwash stage of predetermined length, the controller arrangement 20 is effective to appropriately direct fluid under pressure to the ends 89 of the valves A and D, and the end 88 of the valve B, while venting the opposite ends 88 and 89 thereof, respectively, to drain pressure, thus positioning the valve cores 61–64 as illustrated in FIGURE 7. This initiates recharge flow of brine solution through the water softener tank 11 to remove hardness including ions from the ion exchange resin bed (not shown) in the manner hereinbefore discussed.

During the recharge stage of regeneration, raw water which enters the inlet chamber 67 from the inlet orifice 31 is directed out of the inlet chamber through the aspirator passage 140, seen in both FIGURES 7 and 8. It is forced through an aspirator 141 in the passage 140 which, through a venturi configuration and effect, draws brine from the brine tank 16 through the brine orifice 37 and carries the brine solution on through the passage 140 to the first end port 145 in the bore 51 of the valve A. The brine solution passes along the piston connecting rod 73 of the core 61 in the valve A to the intermediate port 104 thereof and out to the top of the water softener tank 11 through the top inlet-outlet orifice 34.

At this time it should be pointed out that the aspirator 141 is in a relatively upright position in the passage 140. Accordingly, its open mouth 150 is above the venturi restriction (not shown) which, as would be expected, is immediately adjacent the brine inlet orifice 37. Accordingly, there is no possibility of an air pocket forming and breaking the vacuum necessary to draw brine into the valve body 30 through the brine inlet orifice 37.

Returning to the efflux of the brine solution from the top inlet-outlet orifice 34, the solution passes downwardly through the ion exchange resin bed (not shown), in the tank 11, revitalizing the resin bed for softening by taking calcium and magnesium ions into solution. After passing through the ion exchange resin bed and departing the tank 11 at its bottom, the brine solution returns to the valve arrangement 12 and enters the valve body 30 through the bottom inlet-outlet orifice 35. The brine solution passes into the bore 54 of the valve D through its intermediate port 110 and out of the bore 54 through its first end portion 155, to the drain orifice 36 in the drain pipe 17.

While the recharge stage of regeneration is taking place in the foregoing manner, the valve arrangement 12 embodying features of the present invention facilitates the bypass of raw water to service, if such is desired, in the manner described in relation to the backwash stage. A portion of the raw water entering the inlet chamber 67 through the inlet orifice 31 of the valve body 30 leaves the inlet chamber 67 through the first end port 120 in the bore 53 of valve C and passes out the intermediate port 113 therein to the transfer passage 112. The transfer passage 112 empties directly into the soft water outlet orifice 33 having raw water bypass capabilities. Accordingly, if the outlet orifice 33 is not plugged, water is available to service through a pipe 14 during the recharge stage or regeneration.

After a predetermined time period established by the controller arrangement 20, the controller arrangement is effective to urge the valve core 61 into its second position in the valve bore 51 by appropriately delivering fluid under pressure to the end 88 of the valve bore 51 while venting the other end 89 thereof to drain pressure. Accordingly, the settings of the valves A–D and the valve arrangement 12 are as illustrated in FIGURE 9, initiating the fast rinse stage of regeneration.

In the fast rinse stage of regeneration, raw water enters the inlet chamber 67 from the inlet orifice 31 and passes through the second end port 100 in the valve bore 52 of valve B or the intermediate port 101 thereof. Raw water passes from the port 101 through the transfer chamber into the valve bore 51 of the valve A, and through the second end port 103 thereof. Water departs the bore 51 through its intermediate port 104 to the upper inlet-outlet orifice 34.

The raw rinse water then passes downwardly through the water softening tank 11 and its ion exchange resin bed (not shown) flushing out residual brine and other foreign matter, and is returned to the valve body 30 through its lower inlet-outlet orifice 35. The rinse water containing residual brine and other impurities enters the bore 54 of the valve D through its intermediate port 124 and passes out the first end port 155 thereof of the drain orifice 36.

Collateral to the operation of the fast rinse stage of regeneration, water is delivered to the brine tank 16 from the valve body 30 to refill it for the next regeneration cycle. The brine tank 16 receives water from the inlet chamber 67 through the aspirator passage 140 and out the brine inlet orifice 37. When the water level in the brine tank 16 reaches a predetermined level, a conventional float valve (not shown) in the tank 16 stops the refilling flow of raw water in a well-known manner.

While the valve cores 61–64 are sliding between their first and second positions in corresponding bores 51–54 to change from the service cycle to various stages of the regeneration cycle, for example, it will be noted that the "O" ring seals 91 on the piston heads 71 and 72 of each core 61–64 pass across the end ports of correspondiing bores. In doing so, there is a great tendency for water rushing through these ports under pressure to partially or completely drag the "O" rings 91 out of their seats. It is only through the utilization of a dove-tailed seat 91 for each "O" ring 90 seat that such a result is prevented, since the "O" ring 91 is unable to move even partially out of its seat. Accordingly, utilization of the highly efficient design characteristics of the valve arrangement 12 is facilitated by the use of the dove-tailed seat 90 and "O" ring 91 seat arrangement.

Another feature of the present invention facilitates raw water bypass to service during the regeneration cycle, as has been pointed out several times in the foregoing discussion. For example, in an industrial plant where it is necessary that water be available at all times, and desirable that it be soft water but permissible for it to be raw water, the valve arrangement 12 provides for delivery of raw water to service during regeneration when soft water is not available. Raw water is delivered to service by a pipe 14 through the outlet orifice 33 during the entire regeneration cycle.

In the event the commercial utilizer of the water conditioning system 10 requires soft water only for his operation, which might be a chemical process or the like, it is only necessary to plug up the outlet orifice 33. Accordingly, it is impossible for raw water to get into the service system since the outlet orifice 32, which does not have raw water bypass capabilities, is blocked off during the entire regeneration cycle. Under such circumstances, if the commercial utilizer has two water softening systems, they can readily be hooked up in parallel so that service soft water is available at all times, the respective outlet orifices 33 being capped and regeneration taking place at different times in each system.

In addition to the advantages of the present invention elicited during the foregoing discussion thereof, the coplanar, parallel relationship of the valves A–D provides for a relatively low pressure drop across the valve arrangement 12. In other words, the fluid which passes through the valve arrangement 12 during service or any of the stages of regeneration, is forced to travel a route which is less circuitous than ordinarily expected in broadly similar valve arrangements.

Although a preferred embodiment of this invention has been shown and described, it will be understood that various other embodiments, modifications and improvements might fall within the scope of the invention. Consequently, it is intended that the invention be limited only by the appended claims.

What is desired to be claimed and secured by Letters Patent of the United States is:

1. A valve arrangement for controlling the flow of water and recharging fluid to and from a water softener tank during service and regeneration, comprising; a valve body in fluid communication with a water softener tank, four valve bores within said valve body, a valve core slidably mounted in each of said bores and defining valves A, B, C, and D, each of said valves being a two-position valve, a raw water inlet orifice to said valve body, a soft water outlet orifice from said valve body, a raw water bypass outlet orifice from said valve body, soft water being directed to service through said raw water bypass outlet during normal service softening and raw water being directed thereto during regeneration when said bypass outlet is unplugged, while water is directed to service only during service softening when said raw water bypass outlet is plugged.

2. The valve arrangement of claim 1 further characterized in that each of said valve cores alternatively opens and closes a first end port adjacent one end of a corresponding valve bore in a first position thereof, a second end port adjacent the other end of said corresponding valve bore in a second position thereof, each of said valve bores having a permanently open intermediate port, and an inlet chamber in said body separating valves A and B from valves C and D.

3. The valve arrangement of claim 2 further characterized in that said raw water inlet orifice is connected to said inlet chamber, said soft water outlet orifice in said valve body is in communication with the second end port of valve C, and said raw water bypass outlet orifice in said valve body is in communication with the second end port of valve D.

4. A valve arrangement for controlling the flow of water and recharging fluid to and from a water softener tank during service and regeneration, comprising; a relatively flat valve body, four valve bores within said body having their axes disposed in substantially parallel relationship, said bores lying in the same plane whereby the thickness of said valve body is substantially less than its length and a slim water softener tank configuration is provided, a valve core slidably mounted in each of said bores defining valves A, B, C, and D therewith, an inlet chamber in said body separating valves A and B from valves C and D, a raw water inlet orifice to said inlet chamber in said body, a soft water outlet orifice from said body to service, a raw water bypass outlet orifice from said body to service, a top inlet-outlet orifice in said body for communication with a water softener tank, a bottom inlet-outlet orifice in said body for communication with the water softener tank, a drain outlet orifice from said body, a recharging fluid inlet orifice to said body, each of said valves being a two-positioned valve wherein its valve core alternatively opens and closes a first end port adjacent one end of a corresponding valve bore in a first position thereof, and a second end port adjacent the other end of said corresponding valve bore in a second position thereof, each of said valve bores having a permanently open intermediate port, and an aspirator passage in said valve body connecting said inlet chamber with the first end port of valve A.

5. The valve arrangement of claim 4 further characterized in that; when each of said valve cores is in its second position normal service softening is effected, when the valve cores of valves A and D are in their second position while those of B and C are in their first position the backwash stage of regeneration is effected, when the valve cores of valves A, C, and D are in their first position and that of valve B is in its second position the recharge stage of regeneration is effected, and when the cores of valves A and B are in their second position while those of valves C and D are in their first position the fast rinse stage of regeneration is effected.

6. A valve arrangement for controlling the flow of liquid and regenerating fluid to and from an ion exchange tank during treatment and regeneration, comprising: a valve body in liquid communication with an ion exchange tank, four valve bores within said valve body, a valve core slidably mounted in each of said bores and defining valves A, B, C and D, each of said valves being a two-position valve, a raw liquid inlet orifice to said valve body, a treated liquid outlet orifice from said valve body, a raw liquid by-pass outlet orifice from said valve body, treated liquid being directed out of said raw liquid by-pass outlet during normal ion exchange treatment and raw liquid being directed thereto during regeneration when said by-pass outlet is unplugged, while liquid is directed to service only during treatment when said raw liquid by-pass outlet is plugged.

References Cited

UNITED STATES PATENTS

| | | | |
|---|---|---|---|
| 472,579 | 4/1892 | Lundstedt | 137—559 X |
| 2,539,221 | 1/1951 | Badeaux | 137—599.1 |
| 2,792,017 | 5/1957 | Wiczer | 137—599.1 |
| 2,807,280 | 9/1957 | Kittredge | 137—599.1 |
| 2,971,090 | 2/1961 | Piet et al. | |
| 3,019,817 | 2/1962 | Whitlock | 137—624.18 |
| 3,181,564 | 5/1965 | Rudelick | 137—624.18 X |

WILLIAM F. O'DEA, *Primary Examiner.*

D. H. LAMBERT, *Examiner.*

UNITED STATES PATENT OFFICE
CERTIFICATE OF CORRECTION

Patent No. 3,354,907                                              November 28, 1967

Benjamin H. Kryzer et al.

It is hereby certified that error appears in the above numbered patent requiring correction and that the said Letters Patent should read as corrected below.

Column 2, line 6, after "the" insert -- valve --; column 4, line 64, after "valve body" insert --30--; line 74, after "positioning" insert -- of --; column 5, line 5, for "scond" read -- second --; line 38, after "fluid" insert -- under --; column 6, line 61, for "portion" read -- port --.

Signed and sealed this 29th day of April 1969.

(SEAL)
Attest:

Edward M. Fletcher, Jr.                                      EDWARD J. BRENNER
Attesting Officer                                                Commissioner of Patents